(12) United States Patent
Kato et al.

(10) Patent No.: US 9,234,575 B2
(45) Date of Patent: Jan. 12, 2016

(54) SHIFT SWITCHING DEVICE (75) Inventors: Daisuke Kato, Aichi (JP); Hideaki Hayakawa, Aichi (JP); Haruyuki Kodera, Toyota (JP); Kazumi Endo, Toyota (JP); Yusuke Nakade, Toyota (JP); Atsushi Kamada, Toyota (JP)

(73) Assignees: KABUSHIKI KAISHA TOKAI RIKA DENKI SEISAKUSHO, Aichi (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/126,243

(22) PCT Filed: Jun. 23, 2011

(86) PCT No.: PCT/JP2011/064462
§ 371 (c)(1),
(2), (4) Date: Dec. 13, 2013

(87) PCT Pub. No.: WO2012/176316
PCT Pub. Date: Dec. 27, 2012

(65) Prior Publication Data
US 2014/0144272 A1 May 29, 2014

(51) Int. Cl.
*F16H 59/02* (2006.01)
*B60K 20/02* (2006.01)
*B60K 20/08* (2006.01)
(Continued)

(52) U.S. Cl.
CPC ............ *F16H 59/0217* (2013.01); *B60K 20/02* (2013.01); *B60K 20/08* (2013.01); *F16H 59/02* (2013.01); *F16H 59/10* (2013.01);
(Continued)

(58) Field of Classification Search
CPC .......... F16H 2063/423; F16H 61/0248; F16H 59/10; F16H 59/105; F16H 59/12; F16H 59/02; F16H 59/0217; B62M 25/04; B60K 20/08; B60K 20/02
USPC .......... 701/52, 64; 74/473.1–473.13, 74/473.3–473.36, 471 XY; 340/456
See application file for complete search history.

(56) References Cited

U.S. PATENT DOCUMENTS

2002/0014396 A1* 2/2002 Syamoto .................... 200/61.91
2004/0259685 A1 12/2004 Inoue et al.
(Continued)

FOREIGN PATENT DOCUMENTS

CN 101755151 6/2010
JP 57-178085 11/1982
(Continued)

OTHER PUBLICATIONS

English translation of International Preliminary Report on Patentability for PCT/JP2011/064462 (Jan. 2014).
(Continued)

*Primary Examiner* — Roger Pang
(74) *Attorney, Agent, or Firm* — Greenblum & Bernstein, P.L.C.

(57) ABSTRACT

A shift device is provided with a shift lever, a parking switch, and a neutral switch. A transmission is switched to a range, in which the transmission of driving force to driving wheels of a vehicle is started, by the shift lever being operated in two or more directions from a home position and arriving at a specific position. The transmission is switched to a range, in which the transmission of driving force to the driving wheels of the vehicle is interrupted, by the parking switch and the neutral switch being operated in one direction.

18 Claims, 3 Drawing Sheets

(51) Int. Cl.
  *F16H 63/42*  (2006.01)
  *F16H 61/02*  (2006.01)
  *F16H 59/10*  (2006.01)
  *F16H 59/12*  (2006.01)

(52) U.S. Cl.
  CPC ............ *F16H 59/12* (2013.01); *F16H 61/0248* (2013.01); *F16H 2063/423* (2013.01); *Y10T 74/20073* (2015.01)

(56) References Cited

U.S. PATENT DOCUMENTS

2006/0288812 A1* 12/2006 Okawa ........................... 74/335
2010/0145583 A1*  6/2010 Kamada ........................ 701/62
2010/0256880 A1  10/2010 Sato
2012/0305360 A1* 12/2012 Kitaori et al. ............. 192/219.4

FOREIGN PATENT DOCUMENTS

| | | |
|---|---|---|
| JP | 6-65051 | 9/1994 |
| JP | 2002-286131 | 10/2002 |
| JP | 2003-34159 | 2/2003 |
| JP | 2005-7993 | 1/2005 |
| JP | 2007-253912 | 10/2007 |
| JP | 2009-058085 | 3/2009 |
| JP | 2010-100193 | 5/2010 |
| WO | WO 2011077520 A1 * 6/2011 .......... F16H 63/3466 |

OTHER PUBLICATIONS

International Search Report of PCT/JP2011/064462, mail date is Sep. 6, 2011.
Japan Office action in Japan Patent Application No. 2013-521386, mail date is Apr. 14, 2015.
China Official Action in China Application No. 201180071760.6, mail date is Oct. 23, 2015.

* cited by examiner

Fig.6

SHIFT SWITCHING DEVICE

TECHNICAL FIELD

The present invention relates to a shift switching device.

BACKGROUND ART

Over these recent years, automatic transmission vehicles have become popular in which automatic transmissions are installed to automatically switch gear ratios of the vehicle in accordance with the vehicle velocity, engine speed, or the like. The driver of an automatic transmission vehicle tilts a shift lever of the shift device to designate a shift mode of the automatic transmission.

For example, Patent Document 1 describes a shift device in which a shift lever is tiltable from a home position to a drive position (D position), a reverse position (R position), an upshift position (+ position), and a downshift position (− position). The mode designation positions are set toward the front, rear, left, and right of the home position. The shift lever is tilted from the home position to the front, rear, left, or right to switch the shift mode of the automatic transmission. The shift device further includes a push-type neutral switch and parking switch located toward the front from the shift lever at a location separated from the driver seat. By operating the neutral position or the parking switch, the automatic transmission is switched to a neutral mode or a parking mode.

PRIOR ART DOCUMENTS

Patent Documents

Patent Document 1: Japanese Laid-Open Patent Publication No. 2007-253912

SUMMARY OF THE INVENTION

Problems that are to be Solved by the Invention

In the shift device described in patent document 1, the driver tilts the shift lever from the home position in one direction to move the shift lever to one of the mode designation positions. Further, the neutral switch and the parking switch may be operated by pushing their operation surfaces in one direction. In this manner, the switching of modes is easy. Thus, the drive should be cautious when performing such a switching operation. When the operation of the shift lever or the neutral switch is complicated, there would be no need for caution. However, smooth operations would become difficult.

Accordingly, it is an object of the present invention to provide a shift switching device that improves operability.

Means for Solving the Problem

A first aspect of the present invention is shift switching device that outputs a signal for switching shift modes in a transmission of a vehicle in accordance with operation of an operation lever and a switch that are operated in different manners. The shift switching device outputs a signal for switching the shift mode to a drive mode or a reverse mode when recognizing that the operation lever has been operated in a plurality of directions from the home position to a drive position or a reverse position, and automatically returns to the home position when the operation lever is released from an operation force applied to the operation lever. Further, the shift switching device includes a parking switch and a neutral switch as the switch, outputs a signal for switching the shift mode to a parking mode when recognizing that the parking switch has been operated in fewer directions than the plurality of directions, and outputs a signal for switching the shift mode to a neutral mode when recognizing that the neutral switch has been operated in fewer directions than the plurality of directions.

The first aspect uses the difference in the number of times the operation lever is operated from that of the parking switch and the neutral switch, and allocates the mode for transmitting power to the operation lever that is operated for a large number of times and allocates the mode for cutting the power to the two switches that are operated for a small number of times.

Thus, the operation lever, which is operated many times, does not easily reach the drive position or the reverse position, and the transmission of power to the drive wheel of the vehicle is suppressed. Further, by operating the parking switch or the neutral switch, which are operated for a small number of times, the switching to a mode that cuts power is facilitated. In this manner, the operation lever is operated for a number of times that differs from that of the two switches and allows for these components to be clearly distinguished from each other. This allows for further accurate operations and improves the operability.

In a second aspect, the neutral switch is arranged closer to a driver seat than the parking switch.

In the second aspect, the neutral switch is arranged closer to a driver seat than the parking switch. When the user does not set the mode of the transmission to the neutral mode, among the two switches, the neutral switch has to be selectively operated. In particular, when driving the vehicle, a situation in which the driver has to pay excessive attention to the two switches is not preferable. In this respect, the neutral switch is arranged closer to the driver to facilitate operation. This facilitates operation of the neutral switch, particularly, when the vehicle is being driven. Further, the parking switch is arranged farther from the driver than the neutral switch. This prompts the user to operate the switch with further caution.

In a third aspect, a distance between the neutral switch and the parking switch is set to be longer than a distance between the operation lever at the home position and one of the two switches.

In the third aspect, the parking switch and the neutral switch are separated from each other. This facilitates recognition of the parking switch and the neutral switch. Thus, these switches may be operated with further accuracy.

In a fourth aspect, the neutral switch and the parking switch are located on opposite sides of the operation lever.

In the fourth aspect, the neutral switch and the parking switch are separated and located on opposite sides of the operation lever. This facilitates recognition of the parking switch and the neutral switch. Thus, these switches may be operated with further accuracy.

In a fifth aspect, the parking switch is arranged along an extension of a shift operation direction of the operation lever, and the neutral switch is arranged along an extension of a selection operation direction of the operation lever between the drive position and the reverse position.

In the fifth aspect, the parking switch is arranged along an extension of a shift operation direction of the operation lever, and the neutral switch is arranged along an extension of a selection operation direction of the operation lever between the drive position and the reverse position. In this manner, by separating the locations of the two switches, recognition of the two switches is facilitated, and these switches may be operated with further accuracy.

In a sixth aspect, operation surfaces of the two switches have different shapes or areas.

In the sixth aspect, the operation surfaces of the two switches have different shapes or areas. Thus, the appearance of the parking switch and the neutral switch facilitates recognition and allows for further accurate operation.

In a seventh aspect, the parking switch is arranged at a side of the reverse position, and the neutral switch is arranged at a side of the drive position.

In the seventh aspect, the parking switch is arranged at a side of the reverse position, and the neutral switch is arranged at a side of the drive position. Accordingly, the drive position and the neutral switch are arranged near each other. The operation lever is operated to the drive position when driving the vehicle. Further, the neutral switch may be operated when the vehicle is being driven unlike the parking switch. In this manner, the neutral switch, which may be operated when the vehicle is being driven, is located proximal to the drive position, which is in the operation direction of the operation lever. This allows for further accurate operations.

In an eight aspect, the parking switch and the neutral switch include light emitting bodies that illuminate operation surfaces of the parking switch and the neutral switch with different colors of light.

In the eighth aspect, light emitting bodies emit colors of light that differ between the parking switch and the neutral switch. This facilitates recognition of the parking switch and the neutral switch and allows for further accurate operation of these switches.

One example of the present invention provides a shift switching device for use with a vehicle including a drive wheel. The shift switching device outputs a signal for switching shift modes of a transmission operated in a plurality of modes including a mode for cutting transmission of power to the drive wheel and a mode for transmitting power to the drive wheel. The shift switching device includes a shift panel including a gate provided with a plurality of mode designation positions. A shift lever is movable along the gate. The shift lever automatically returns to the home position when operation force applied to the shift lever is released. A push type operation member is separated from the shift lever and associated with the mode that cuts the transmission of power to the drive wheel. The plurality of mode designation positions of the gate include a drive start designation position selected when starting the transmission of power to the drive wheel to which power is not being transmitted, and the drive start designation position is located at a position that the shift lever reaches when moved from the home position in two or more directions.

In a preferred example, the drive start designation position is a drive position and a reverse position. Further, the push type operation member includes a parking switch and a neutral switch, which is arranged closer to a driver seat than the parking switch.

In a preferred example, the plurality of mode designation positions of the gate further includes a gear ratio changing position selected when changing a gear ratio of the transmission. Further, the gear ratio changing position is located at a position that the shift lever reaches when moved from the home position in a single direction.

Effect of the Invention

The present invention allows for a shift switching device to have improved operability.

EMBODIMENTS OF THE INVENTION

One embodiment of a shift switching device according to the present invention applied to a shift device will now be described with reference to FIGS. 1 to 4.

Figures 1A, 1B, 1C:
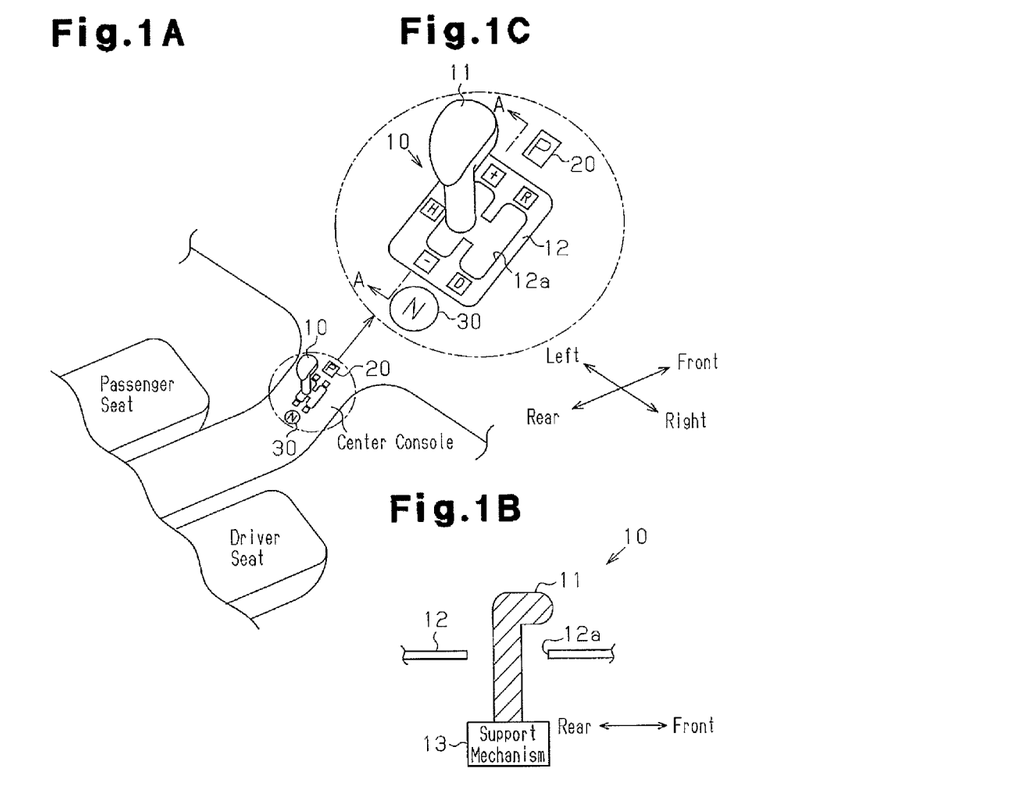
FIG. 1A is a perspective view of a shift device.
FIG. 1B is a cross-sectional view taken along line A-A in FIG. 1A.
FIG. 1C is an enlarged view of the shift device.

As shown in FIG. 1A, the shift device is arranged on a center console and arranged between the drive seat and the passenger seat. The shift device includes a lever device 10, a parking switch 20, and a neutral switch 30.

As shown in FIG. 1C, the lever device 10 includes a shift lever 11 and a shift panel 12. The shift panel 12 and the center console are formed on the same surface. The shift panel 12 includes a generally H-shaped gate 12a.

As shown in FIG. 1B, the shift lever 11 includes a distal end located outside the shift panel 12. Further, the shift lever 11 includes a basal end connected to a support mechanism 13 inside the shift panel 12. The support mechanism 13 supports the shift lever 11 to allow for tilting toward the front, rear, left, and right. A shaft of the shift lever 11 is arranged in the gate 12a of the shift panel 12. The shift lever 11 is tiltable along the gate 12a. The gate 12a includes a left front end set as an "upshift (+) position," a left rear end set as a "downshift (−) position," a right front end set as a "reverse (R) position," and a right rear end set as a "drive (D) position." A middle position between the "upshift position" and the "downshift position" is set as a "home (H) position."

The shift lever 11 is operated in the front direction from the home position to the upshift position. The shift lever 11 is operated in the rear direction from the home position to the downshift position.

The shift lever 11 is operated in the right direction from the home position and then operated in the front direction to the reverse position. The shift lever 11 is operated in the right direction from the home position and then operated in the rear direction to the drive position. In this manner, to move the shift lever 11 from the home position to the drive position or the reverse position, the shift lever 11 has to be operated in a plurality of directions. In the present example, the front and rear directions define a shift operation direction, and the left and right directions define a selection operation direction. The drive position and the reverse position may be referred to as drive start designation positions selected when starting the transmission of power to the drive wheels.

When the shift lever 11 is released from an operation force, the support mechanism 13 returns the shift lever 11 to the home position. The lever device 10 is of a so-called momentary type.

The parking switch 20 and the neutral switch 30 are formed by push-type switches. The parking switch 20 and the neutral switch 30 are arranged on opposite sides of the lever device 10. In detail, the neutral switch 30 is located toward the rear of the lever device 10, and the parking switch 20 is located toward the front of the lever device 10. The neutral switch 30, which is arranged toward the front of the lever device 10, is located at a closer side to the driver. This allows for the driver to easily operate the neutral switch 30. The parking switch 20 is located at a position farther from the driver than the shift lever 11. This allows for the driver to operate the parking switch 20 with increased accuracy when driving the vehicle.

The parking switch 20 and the neutral switch 30 each include an operation surface that is flush with the surface of the center console. The operation surface of the neutral switch 30 is, for example, circular, and the operation surface of the parking switch 20 is, for example, tetragonal. The operation surface of the neutral switch 30 has a larger area than that of the parking switch 20.

An electric circuit of the shift device will now be described.

Figure 2:
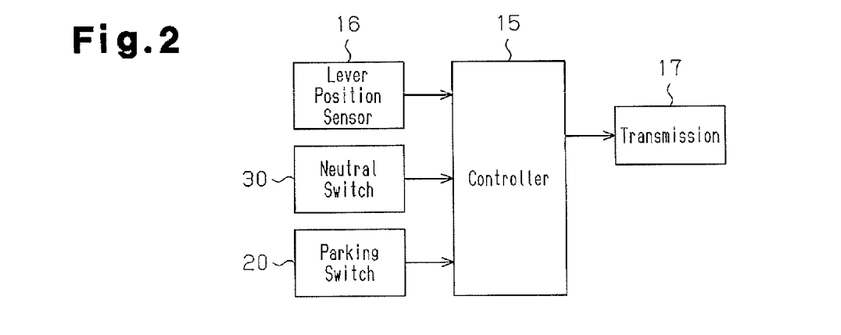
FIG. 2 is a block diagram of the shift device.

As shown in FIG. 2, a lever position sensor 16 detects where the shift lever 11 is located and provides the detection result to a controller 15. Based on the detection result of the lever position, the controller 15 determines operation of the shift lever 11 from the home position and the selected mode designation position.

The parking switch 20 and the neutral switch 30 each provides the controller 15 with an operation signal when pushed. Based on the operation signal, the controller 15 determines that the parking switch 20 or the neutral switch 30 has been operated.

Based on the signals provided from the lever position sensor 16, the parking switch 20, and the neutral switch 30, the controller 15 outputs a control signal requesting for the shift mode of a transmission 17 to be switched. The control signal switches the shift mode of the transmission 17. More specifically, when the shift lever 11 is operated to the drive position, the controller 15 switches the transmission 17 to the D mode with the control signal. In the D mode, the transmission 17 switches the gear ratio in accordance with the vehicle velocity of the engine speed. When the shift lever 11 is operated to the rear position, the controller 15 switches the transmission 17 to the R mode with the control signal. When the transmission 17 is in the D mode and the shift lever 11 is operated to the upshift position, the controller 15 switches and upshifts the gear ratio of the transmission 17 by one gear with the control signal. When the transmission 17 is in the D mode and the shift lever 11 is operated to the downshift position, the controller 15 switches and downshifts the gear ratio of the transmission 17 by one gear with the control signal. When the transmission 17 is not in the D mode but the shift lever 11 is operated to the upshift position or the downshift position, the controller 15 does not change the shift mode of the transmission 17.

When the neutral switch 30 is operated, the controller 15 switches the transmission to a mode (neutral (N) mode) that does not transmit power from the engine to the drive wheels. When the parking switch 20 is operated, the controller 15 switches the transmission 17 to a mode (P mode) that immobilizes the drive system. The parking switch 20 or the neutral switch 30 corresponds to a switch. Examples of modes in which the transmission of power to the drive wheels of the vehicle is cut include the N mode and the P mode.

Figure 3:
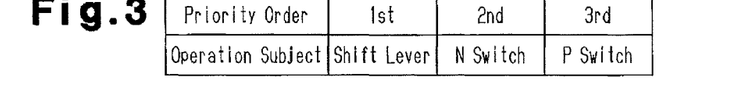
FIG. 3 is a diagram illustrating a priority order of operation members.

Referring to FIG. 3, a priority order of the shift lever 11, the neutral switch 30, and the parking switch 20 will now be described. In detail, the shift lever 11 is ranked first in the priority order, the neutral switch 30 is ranked second, and the parking switch 20 is ranked third. When two or three of the shift lever 11, the neutral switch 30, and the parking switch 20 are simultaneously operated, the modes of the transmission 17 are switched in accordance with the priority order. This improve the failsafe characteristics for when a failure occurs in the parking switch 20 and when the shift lever 11, the neutral switch 30, and the parking switch 20 are operated together.

For example, even when a failure occurs in the parking switch 20 and an ON operation signal for switching the transmission 17 to the P mode is continuously output, by operating the shift lever 11, which has a higher priority than the parking switch 20, to the drive position or the like, the controller 15 switches the transmission 17 to the D mode and allows for the vehicle to be driven.

Further, for example, when a failure occurs in the parking switch 20 and an ON operation signal cannot be output, the controller 15 automatically switches the transmission 17 to the P mode based on the operation of an engine start switch that deactivates the power supply of the vehicle. In this manner, there are no problems even when the parking switch 20 has a lower priority than the engine start switch.

Further, the neutral switch 30 is set to have a higher priority than the parking switch 20. This ensures that the transmission of power to the drive wheels is cut during an emergency.

Figure 4:
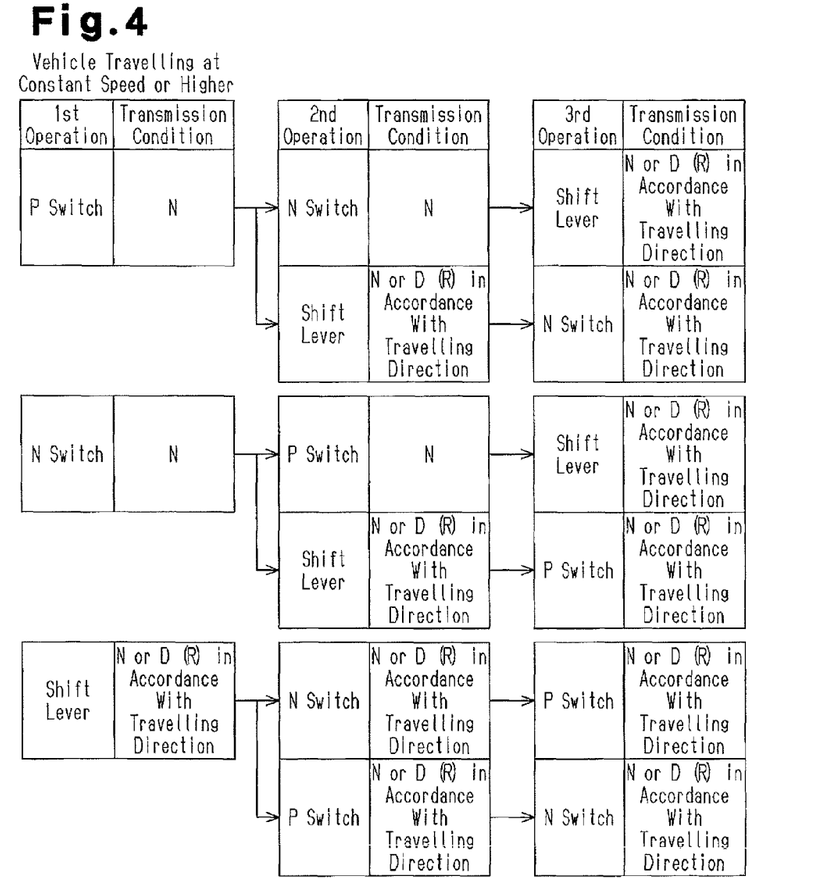
FIG. 4 is a chart illustrating the operation of operation members and the condition of the transmission when the vehicle is being driven.

When the vehicle is being driven, to ensure a failsafe structure, the shift mode of the transmission is switched in accordance with the chart shown in FIG. 4 based on the priority order described above.

First, a case in which the parking switch 20 undergoes a first operation will be described. Then, a case in which the shift lever 11 undergoes one of first to third operations will be described. In other cases, the modes of the transmission 17 are switched in accordance with the above priority order.

Referring to the upper section in FIG. 4, when the vehicle is travelling at a predetermined velocity or higher and the parking switch 20 undergoes the first operation, the controller 15 switches the mode of the transmission 17 from the D mode to the N mode. The transmission 17 does not immobilize the drive system even if the parking switch 20 is operated when the vehicle is travelling at a predetermined speed or higher. This prevents sudden stopping of the vehicle.

Further, when the shift lever 11 undergoes one of the first to third operations, the mode of the transmission 17 is switched in accordance with the moving direction of the vehicle. In detail, when the vehicle is moving forward at a predetermined speed or higher and the shift lever 11 is operated to the drive position, the controller 15 maintains the transmission 17 in the drive mode or switches the transmission 17 from the N mode to the D mode. When the vehicle is moving forward at a predetermined speed or higher and the shift lever 11 is operated to the reverse position, to ensure a failsafe structure, the controller 15 maintains the transmission 17 in the N mode or switches the transmission 17 from the D mode to the N mode.

When the vehicle is moving rearward at a predetermined speed or higher and the shift lever 11 is operated to the reverse position, the controller 15 maintains the transmission 17 in the reverse mode or switches the transmission 17 from the N mode to the R mode. When the vehicle is moving rearward at a predetermined speed or higher and the shift lever 11 is operated to the drive position, to ensure a failsafe structure, the controller 15 maintains the transmission 17 in the N mode or switches the transmission 17 from the R mode to the N mode.

Accordingly, when the shift lever 11 is included in the simultaneously operated operation portions, the shift lever 11 has priority over the parking switch 20 and the neutral switch 30. Thus, as described above, the mode of the transmission is switched in accordance with the moving direction of the vehicle. In the illustrated example, the controller 15 controls the transmission 17 by giving priority to a detection signal from the lever position sensor 16 that represents the drive position and the reverse position over operation signals from the parking switch 20 and the neutral switch 30 so that operations of the shift lever 11 to the drive position and the reverse position have priority over the parking switch 20 and the neutral switch 30.

The advantages of the present embodiment will now be described.

(1) The mode designation position (e.g., D position or R position) of the shift lever 11 corresponding to the mode of the transmission 17 that starts the transmission of power to the drive wheels of the vehicle is set at the position to where the shift lever 11 is moved from the home position (H position) in a plurality of directions (e.g., the two directions toward the side and the front or the two directions toward the side and the rear). To switch the transmission to a mode for starting the transmission of power to the drive wheels, the driver needs to operate the shift lever 11 from the home position in a plurality of directions. This suppresses easy movement of the shift lever 11 to the D position or the like. As a result, situations in which the vehicle starts to move are suppressed.

To improve operability, the number of directions in which the driver operates the parking switch 20 or the neutral switch 30 is fewer than that in which the driver operates the shift lever 11 to designate the position that starts transmitting power to the drive wheels. More specifically, the driver only needs to push the parking switch 20 or the neutral switch 30 in a single operation direction. The parking switch 20 and the neutral switch 30 correspond to modes of the transmission for cutting the transmission of power to the drive wheels. Accordingly, even when the parking switch 20 or the neutral switch 30 is operated, the controller 15 switches the transmission 17 to a mode for cutting the transmission of power to the drive wheels of the vehicle, and the vehicle does not move. In this manner, the parking switch 20 and the neutral switch 30 differ from shift lever 11 in that priority may be given to operability.

In this manner, the operation of the shift lever 11, the parking switch 20, and the like are configured to be suitable for the action contents of the vehicle resulting from the operation. This allows for the operability of the shift device to be improved.

(2) The neutral switch 30 is arranged closer to the driver seat than the parking switch 20. When the user wishes to switch the transmission 17 to the N mode, the user has to selectively operate the neutral switch 30. In particular, a user who is not aware of the failsafe function that is based on the priority order, the user would accurately operate the parking switch 30 when driving the vehicle. Thus, the user would operate the two switches 20 and 30 with further care. In this regard, by arranging the neutral switch 30 near the driver, the operation of the neutral switch 30 is further facilitated, especially, when driving the vehicle. In addition, the arrangement of the parking switch 20 at a location farther than the shift lever 11 allows for further accurate operation of the parking switch 20 when driving the vehicle. Further, the parking switch 20 is operated when the vehicle is not moving. Thus, even though the parking switch 20 is arranged at a location relatively far from the driver seat, the user is able to operate the parking switch 20 without any problem.

(3) The two switches 20 and 30 are located on opposite sides of the shift lever 11. That is, the parking switch 20 is located on the other side of the shift lever 11 as viewed from the driver. This allows for accurate operation of the parking switch 20 when driving the vehicle. Further, the neutral switch 30 is arranged closer to the driver than the shift lever 11. Thus, when operating the neutral switch 30, the shift lever 11 does not act as a physical obstruction, and the operation of the neutral switch 30 is facilitated.

(4) The area of the operation surface of the neutral switch 30 is larger than that of the parking switch 20. This further facilitates operation of the neutral switch 30.

(5) Among the mode designation positions formed in the gate 12a, the upshift position (+) and the downshift position (−), which are selected when changing the gear ratio of the transmission 17, are located at positions reached by moving the shift lever 11 from the home position in one direction. This facilitates operations for selecting the upshift position and the downshift position when driving the vehicle.

Further, the upshift position and the downshift position are not drive start designation positions selected when starting the transmission of power to the drive wheels. That is, when the transmission 17 is in a mode (e.g., N or P) for cutting the transmission of power to the drive wheels, the vehicle does not move unless the driver moves the shift lever 11 to the D position or the R position to switch to a mode (D, R) that starts transmitting power from the transmission 17 to the drive wheels. This suppresses situations in which the vehicle starts to move.

(6) The parking switch 20 is arranged in the proximity of the reverse position, and the neutral switch 30 is arranged in the proximity of the drive position. In this manner, the two switches 20 and 30 are arranged on opposite sides of the shift lever 11 along the moving direction of the vehicle. This allows for the neutral switch 30 to be located at a position where it can be operated with further ease, and the parking switch 20 to be located at a position where it is difficult to operate when driving the vehicle.

The above embodiment may be modified in the following manner.

Figure 5:
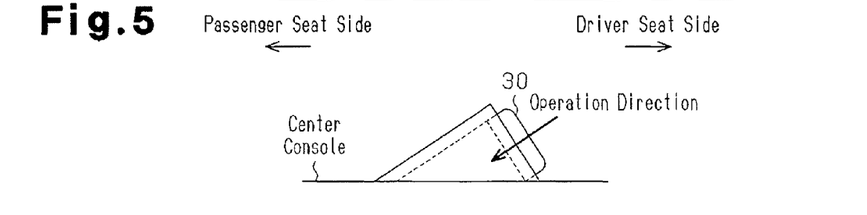
FIG. 5 is a side view of a neutral switch in a modified example.

In the above embodiment, the neutral switch 30 is arranged so that its operation surface is flush with the surface of the center console. However, as shown in FIG. 5, the operation surface of the neutral switch 30 may be inclined relative to the surface of the center console. This structure further facilitates operation of the neutral switch 30. Further, the difference in shape from the parking switch 20 allows for the two switches 20 and 30 to be distinguished at a glance. This allows for further accurate operations. Further, even when an object is dropped on the operation surface of the neutral switch 30, the direction in which the object naturally falls due to gravitational force differs from the operation direction of the neutral switch 30. This suppresses pushing of the neutral switch 30 when an object falls.

Figure 6:
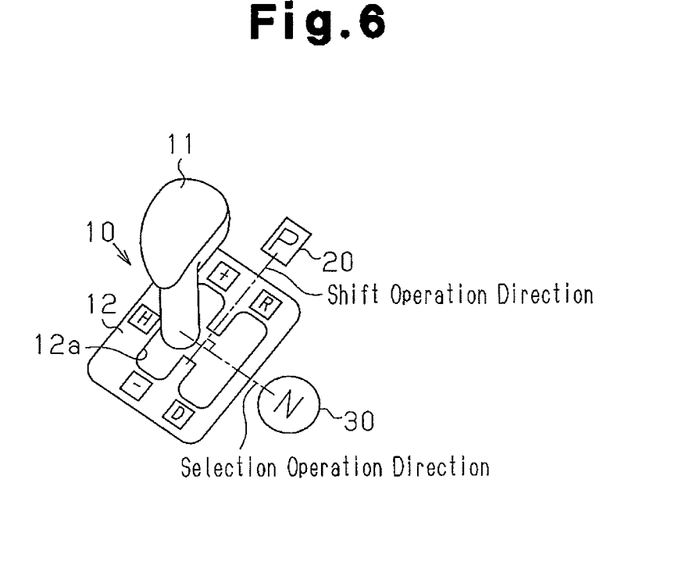
FIG. 6 is a perspective view of a shift device in a modified example.

In the above embodiment, the parking switch 20 and the neutral switch 30 are located on opposite sides of the lever device 10. However, there is no such limit to the locations of the parking switch 20 and the neutral switch 30. For example, as shown in FIG. 6, the parking switch 20 may be arranged along the extension of the shift operation direction of the shift lever 11 in the same manner as the neutral switch 30. Further, the neutral switch 30 may be arranged along the selection operation direction of the shift lever 11 between the drive position and the reverse position. This structure also allows the two separated switches 20 and 30 to be easily distinguished from each other and enables for accurate operations.

Further, the parking switch 20 and the neutral switch 30 may be arranged beside the shift lever 11.

In the above embodiment, a light emitting body such as a light emitting diode (LED) may be arranged in the parking switch 20 and the neutral switch 30. This improves the visibility of the parking switch 20 and the neutral switch 30. The parking switch 20 and the neutral switch 30 may be illuminated by different colors of light. This allows for the parking switch 20 and the neutral switch 30 to be operated with further accuracy.

Further, different colors may be printed or painted to the parking switch 20 and the neutral switch 30.

In the above embodiment, the area of the operation surface of the neutral switch 30 is larger than that of the parking switch 20. Instead, the area of the operation surface of the parking switch 20 may be larger than that of the neutral switch 30. Further, the two switches 20 and 30 may have the same area. The operation surfaces of the two switches 20 and 30 may also have the same shape.

The neutral switch 30 and the parking switch 20 may be formed by a single switch. In this case, for example, when the switch is pushed for a short time, in the same manner as when the neutral switch 30 is operated, the transmission 17 is switched to the N mode. Further, when the switch is pushed for a long time, in the same manner as when the parking switch 20 is operated, the transmission 17 is switched to the P mode. This structure further facilitates the structure of the shift device.

In the above embodiment, at least one of the parking switch 20 and the neutral switch 30 may be arranged on the operation knob of the shift lever 11. For example, one of the two switches 20 and 30 may be arranged on the operation knob, and the other one may be arranged at the same location as the above embodiment so that the difference in locations of the two switches 20 and 30 is evident.

The direction in which the lever device 10 is arranged in not limited to that of the above embodiment and may be arranged, for example, on the instrument panel in the vertical direction. In this case, the R position is arranged in the upward direction of the vehicle relative to the home position of the shift lever 11, and the D position is arranged in the downward direction of the vehicle relative to the home position of the shift lever 11.

In the above embodiment, the parking switch 20 and the neutral switch 30 are push type switches. However, there is no limit to the type of switch as long as it may be operated in fewer operation directions than the shift lever 11. For example, a slide switch or a rotary switch may be used.

In the above embodiment, operations in two directions are performed to operate the shift lever 11 from the home position or the drive position or the reverse position. However, there is no limit to two directions as long as operations may be performed in a plurality of directions.

DESCRIPTION OF REFERENCE CHARACTERS

10: lever device, 11: shift lever, 12: shift panel, 17: transmission, 20: parking switch, 30: neutral switch

The invention claimed is:

1. A shift switching device that outputs a signal for switching shift modes in a transmission of a vehicle in accordance with operation of an operation lever and switches that are operated in different manners, wherein the shift switching device:
   outputs a signal for switching the shift mode to a drive mode or to a reverse mode when recognizing that the operation lever has been operated in a selection operation direction and then in a shift operation direction to move the operation lever from a home position to a drive position or to a reverse position, and automatically returns the operation lever to the home position when the operation lever is released from an operation force applied to the operation lever;
   includes a parking switch and a neutral switch in the switches;
   outputs a signal for switching the shift mode to a parking mode when recognizing that the parking switch has been operated; and
   outputs a signal for switching the shift mode to a neutral mode when recognizing that the neutral switch has been operated,
   wherein the neutral switch and the parking switch are located on opposite sides of the operation lever, and the neutral switch is arranged at a rear side relative to the parking switch in the shift operation direction.

2. The shift switching device according to claim 1, wherein the neutral switch is positioned closer to a driver seat than the parking switch.

3. The shift switching device according to claim 1, wherein a distance between the neutral switch and the parking switch is greater than a distance between the operation lever at the home position and one of the neutral switch and the parking switch.

4. The shift switching device according to claim 1, wherein operation surfaces of the neutral switch and the parking switch have different shapes or areas.

5. The shift switching device according to claim 1, wherein the parking switch is positioned at a side of the reverse position, and the neutral switch is positioned at a side of the drive position.

6. The shift switching device according to claim 1, wherein the parking switch and the neutral switch include light emitters that illuminate operation surfaces of the parking switch and the neutral switch with different colors of light.

7. The shift switching device according to claim 1, wherein a direction of operation of the neutral switch is different than a direction of operation of the parking switch.

8. A shift switching device that outputs a signal for switching shift modes in a transmission of a vehicle in accordance with operation of an operation lever and switches that are operated in different manners, wherein the shift switching device:
   outputs a signal for switching the shift mode to a drive mode or to a reverse mode when recognizing that the operation lever has been operated in a selection operation direction and then in a shift operation direction to move the operation lever in a shift gate from a home position to a drive position or to a reverse position, and automatically returns the operation lever to the home position when the operation lever is released from an operation force applied to the operation lever;
   includes a parking switch and a neutral switch in the switches;
   outputs a signal for switching the shift mode to a parking mode when recognizing that the parking switch has been operated; and
   outputs a signal for switching the shift mode to a neutral mode when recognizing that the neutral switch has been operated,
   wherein the parking switch is positioned along an extension of the shift operation direction of the operation lever and substantially at the center of the shift gate in the selection operation direction, and the neutral switch is positioned along an extension of the selection operation direction of the operation lever that passes through an intermediate position between the drive position and the reverse position,
   wherein, when projecting the parking switch in the shift operation direction onto the extension of the selection operation direction, a projected position of the parking switch is spaced from the home position by a first distance in the selection operation direction, and the neutral switch is spaced from the home position in the selection operation direction by a second distance that is greater than the first distance.

9. The shift switching device according to claim 8, wherein a direction of operation of the neutral switch is different than a direction of operation of the parking switch.

10. The shift switching device according to claim 8, wherein operation surfaces of the neutral switch and the parking switch have different shapes or areas.

11. The shift switching device according to claim 8, wherein the parking switch and the neutral switch include light emitters that illuminate operation surfaces of the parking switch and the neutral switch respectively, with different colors of light.

12. A shift switching device for use with a vehicle including a drive wheel, wherein the shift switching device outputs a signal for switching shift modes of a transmission operated in a plurality of modes including a power cutting mode that cuts power transmission to the drive wheel and a power transmitting mode that transmits power to the drive wheel, the shift switching device comprising:
   a shift panel including a gate provided with a plurality of mode designation positions;
   a shift lever movable along the gate, wherein the shift lever automatically returns to a home position when an operation force applied to the shift lever is released; and
   push type operation members each spaced from the shift lever and associated with the power cutting mode;
   wherein the plurality of mode designation positions of the gate include drive start designation positions selected when starting the transmission of power to the drive wheel to which power is not being transmitted, the drive start designation positions include only a drive position and a reverse position, each located at a position that the shift lever reaches when moved from the home position in a selection operation direction and then in a shift operation direction that is orthogonal to the selection operation direction, and the push type operation members include a parking switch and a neutral switch, and wherein the parking switch is located substantially at the center of the gate in the selection operation direction.

13. The shift switching device according to claim 12, wherein the neutral switch is positioned closer to a driver seat than the parking switch.

14. The shift switching device according to claim 12, wherein
   the plurality of mode designation positions of the gate further includes a gear ratio changing position selected when changing a gear ratio of the transmission, and
   the gear ratio changing position is located at a position that the shift lever reaches when moved from the home position in a single direction.

15. The shift switching device according to claim 12, wherein a direction of operation of the neutral switch is different than a direction of operation of the parking switch.

16. The shift switching device according to claim 12, wherein the parking switch and the neutral switch include light emitters that illuminate operation surfaces of the parking switch and the neutral switch respectively, with different colors of light.

17. The shift switching device according to claim 12, wherein the neutral switch and the parking switch are located on opposite sides of the shift lever, and the neutral switch is located at a rear side relative to the parking switch in the shift operation direction.

18. The shift switching device according to claim 12, wherein when projecting the parking switch in the shift operation direction onto a line in the selection operation direction, a projected position of the parking switch is spaced from the home position by a first distance in the selection operation direction, and the neutral switch is spaced from the home position in the selection operation direction by a second distance that is greater than the first distance.

* * * * *